(12) United States Patent
Chiba et al.

(10) Patent No.: US 10,936,836 B2
(45) Date of Patent: *Mar. 2, 2021

(54) PORTABLE TERMINAL

(71) Applicant: CASIO COMPUTER CO., LTD., Tokyo (JP)

(72) Inventors: Yasunori Chiba, Tachikawa (JP); Satoshi Ogasawara, Akishima (JP); Shinya Okumura, Kusatsu (JP); Yoshiaki Mochizuki, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,382

(22) Filed: Sep. 20, 2019

(65) Prior Publication Data
US 2020/0012830 A1 Jan. 9, 2020

Related U.S. Application Data

(62) Division of application No. 16/039,528, filed on Jul. 19, 2018, now Pat. No. 10,515,247.

(30) Foreign Application Priority Data

Jul. 20, 2017 (JP) .............................. JP2017-141267

(51) Int. Cl.
*G06K 7/10* (2006.01)
*G06K 7/14* (2006.01)

(52) U.S. Cl.
CPC ....... *G06K 7/10881* (2013.01); *G06K 7/1413* (2013.01); *G06K 2007/10524* (2013.01)

(58) Field of Classification Search
CPC ............. G06K 7/10881; G06K 7/1413; G06K 2007/10524

(Continued)

(56) References Cited

U.S. PATENT DOCUMENTS 5,477,043 A   12/1995   Dvorkis
5,786,585 A   7/1998   Eastman et al.
(Continued)

FOREIGN PATENT DOCUMENTS

CN   101887953 A   11/2010
JP   H08507887 A   8/1996
(Continued)

OTHER PUBLICATIONS

Related U.S. Appl. No. 16/039,550; First Named Inventor: Yasunori Chiba; Title: "Portable Terminal, Imaging Device and Reading Device"; filed Jul. 19, 2018.

(Continued)

*Primary Examiner* — Daniel A Hess
(74) *Attorney, Agent, or Firm* — Holtz, Holtz & Volek PC

(57) ABSTRACT

A portable terminal includes a device body, a grip section located closer to a first end than to a second end of the device body, and a projecting section located closer to the second end than to the first end of the device body. An operation switch is provided between the projection section and the first end of the device body. The operation switch includes a pressing surface that is at an angle with respect to a thickness direction of the device body to face outward from the device body and in a direction toward the second end of the device body. The grip section includes a sloped surface provided between the operation switch and the first end of the device body. And the sloped surface faces away from a direction faced by the pressing surface of the operation switch.

19 Claims, 5 Drawing Sheets

(58) Field of Classification Search
USPC .................................................. 235/462.45
See application file for complete search history.

(56) References Cited

U.S. PATENT DOCUMENTS

| | | | |
|---|---|---|---|
| 5,801,918 A | 9/1998 | Ahearn et al. | |
| 6,637,662 B2 | 10/2003 | Itou et al. | |
| 7,450,968 B2 | 11/2008 | Jung | |
| 7,775,438 B2 | 8/2010 | Beckhusen et al. | |
| 7,839,632 B2 | 11/2010 | Matsui et al. | |
| 8,254,114 B2 | 8/2012 | Lin | |
| 8,730,155 B2 | 5/2014 | Araki et al. | |
| 8,814,049 B2 | 8/2014 | Lee et al. | |
| 10,515,247 B2 * | 12/2019 | Chiba | G06K 7/1413 |
| 2002/0023961 A1 | 2/2002 | Itou et al. | |
| 2008/0084654 A1 | 4/2008 | Gerich | |
| 2008/0148523 A1 | 6/2008 | MacGregor et al. | |
| 2009/0002926 A1 | 1/2009 | Matsui et al. | |
| 2010/0290177 A1 | 11/2010 | Lin | |
| 2010/0302140 A1 | 12/2010 | Araki et al. | |
| 2012/0088547 A1 | 4/2012 | Lee et al. | |
| 2014/0014726 A1 | 1/2014 | Tsiopanos et al. | |
| 2016/0064874 A1 | 3/2016 | Meguro et al. | |
| 2018/0084654 A1 | 3/2018 | Meguro et al. | |
| 2018/0217638 A1 | 8/2018 | Ohtaka et al. | |
| 2019/0082041 A1 | 3/2019 | Chiba | |

FOREIGN PATENT DOCUMENTS

| | | |
|---|---|---|
| JP | H10112891 A | 4/1998 |
| JP | H11203394 A | 7/1999 |
| JP | 2001060999 A | 3/2001 |
| JP | 2002074261 A | 3/2002 |
| JP | 2003030602 A | 1/2003 |
| JP | 2004252600 A | 9/2004 |
| JP | 2004322661 A | 11/2004 |
| JP | 2005027335 A | 1/2005 |
| JP | 2009009195 A | 1/2009 |
| JP | 2009009196 A | 1/2009 |
| JP | 2009282761 A | 12/2009 |
| JP | 2010277508 A | 12/2010 |
| JP | 2010282469 A | 12/2010 |
| JP | 2011107824 A | 6/2011 |
| JP | 2012027923 A | 2/2012 |
| JP | 2012130025 A | 7/2012 |
| JP | 2013156752 A | 8/2013 |
| JP | 2014085684 A | 5/2014 |
| WO | 9414136 A1 | 6/1994 |

OTHER PUBLICATIONS

Related U.S. Appl. No. 16/039,583; First Named Inventor: Yasunori Chiba; Title: "Portable Terminal"; filed Jul. 19, 2018.
Related U.S. Appl. No. 16/039,603; First Named Inventor: Yasunori Chiba; Title: "Portable Terminal, Imaging Device and Reading Device"; filed Jul. 19, 2018.
Japanese Office Action dated Jul. 23, 2019 (and English translation thereof) issued in counterpart Japanese Application No. 2017-141267.
Notice of Allowance dated Aug. 19, 2019 issued in U.S. Appl. No. 16/039,550.
Office Action (Final Rejection) dated Aug. 19, 2019 issued in U.S. Appl. No. 16/039,583.
Office Action (Final Rejection) dated Jul. 18, 2019 issued in U.S. Appl. No. 16/039,603.
Office Action (Non-Final Rejection) dated Apr. 12, 2019 issued in U.S. Appl. No. 16/039,550.
Office Action (Non-Final Rejection) dated Mar. 20, 2019 issued in U.S. Appl. No. 16/039,583.
Office Action (Non-Final Rejection) dated Mar. 1, 2019 issued in U.S. Appl. No. 16/039,603.
Office Action (Non-Final Rejection) dated Jul. 14, 2020 issued in related U.S. Appl. No. 16/039,603.

* cited by examiner

PORTABLE TERMINAL

CROSS-REFERENCE TO RELATED APPLICATION

This is a Divisional application of U.S. application Ser. No. 16/039,528, filed Jul. 19, 2018, which is based upon and claims the benefit of priority from prior Japanese Patent Application No. 2017-141267, filed Jul. 20, 2017, the entire contents of both of which are incorporated herein by reference.

BACKGROUND OF THE INVENTION

1. Field of the Invention

The present invention relates to a handheld portable terminal.

2. Description of the Related Art

For example, a handheld portable terminal is known which has a structure where the lower surface of a device case is formed to have a curved shape and a finger rest projected portion is provided on the lower surface of the device case so that the device case can be gripped by one hand with the thumb of a holding hand of a user being placed on the upper surface of the device case, the other fingers being placed on the lower surface of the device case, and the index finger being hooked on the finger rest projected portion, as described in Japanese Patent Application Laid-Open (Kokai) Publication No. 10-112891.

That is, the portable terminal of this type is structured as follows. The device case is gripped by one hand with the thumb being placed on an operation section provided on the upper surface of the device case and the other fingers being placed on the lower surface of the device case, and the index finger is hooked on the finger rest projected portion provided on the lower surface of the device case as if it is hooked on the trigger of a pistol, so that the operation section on the upper surface is operated by the thumb and a switch key provided on the finger rest projected portion on the lower surface is subjected to a key operation by the index finger.

SUMMARY OF THE INVENTION

In accordance with one aspect of the present invention, there is provided a portable terminal comprising: a grip section provided as one end of a terminal main body and structured to be gripped by one hand in a gripping style where a user places a thumb of the one hand on a first surface of the terminal main body and holds a second surface on a side opposite to the first surface by at least an index finger and a middle finger extended from a side of the terminal main body; a raised portion provided on the second surface of the grip section such that a vertex portion is positioned between the index finger and the middle finger in the gripping style; and a switch section provided such that a pressing target portion is exposed in a sloped surface area of the raised portion where the index finger is positioned in the gripping style.

In accordance with another aspect of the present invention, there is provided a portable terminal comprising: a grip section provided as one end of a terminal main body and structured to be gripped by one hand in a gripping style where a user places a thumb of the one hand on a first surface of the terminal main body and holds a second surface on a side opposite to the first surface by at least an index finger and a middle finger extended from a side of the terminal main body; and a recessed portion provided between the grip section and an other end of the terminal main body, on the second surface side, wherein the grip section is formed such that a position to be supported by the index finger in the gripping style is a sloped surface area extending toward the recessed portion, and a switch section is provided such that a pressing target portion is exposed in the sloped surface area.

In accordance with another aspect of the present invention, there is provided a portable terminal comprising: a grip section provided as one end of a terminal main body and structured to be gripped by one hand in a gripping style where a user places a thumb of the one hand on a first surface of the terminal main body and at least an index finger and a middle finger extended from a side of the terminal main body are naturally placed around a second surface on a side opposite to the first surface, wherein the second surface of the grip section is formed in a curved shape projecting toward the second surface so that fingers other than the thumb are naturally flexed when the user grips the grip section in the gripping style, wherein the second surface of the grip section formed in the curved shape has a raised portion provided such that a vertex portion is positioned between the index finger and the middle finger of the hand of the user gripping the grip section when the user grips the grip section in the gripping style, and wherein a switch section is provided such that a pressing target portion is exposed in a sloped surface area of the raised portion where the index finger is positioned in the gripping style.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of a portable terminal to which the present invention has been applied will hereinafter be described with reference to FIG. 1 to FIG. 5.

This portable terminal includes a device case 1 as a terminal main body, as shown in FIG. 1 to FIG. 5. This device case 1 is formed to have a substantially rectangular shape elongated in a longitudinal direction (portrait orientation in FIG. 1).

This device case 1 is formed to have its substantially half on an upper side as a broad portion 1a, have the remaining half on a lower side as a narrow portion 1b, and have a substantially Japanese battledore shape as a whole, as shown in FIG. 1 to FIG. 5. That is, the broad portion 1a on the upper side is formed so as to have a length (width) in a lateral direction (landscape orientation in FIG. 1) orthogonal to its longitudinal direction longer (wider) than the length (width) of the narrow section 1b on the lower side in the lateral direction (landscape orientation in FIG. 1).

Figure 1:
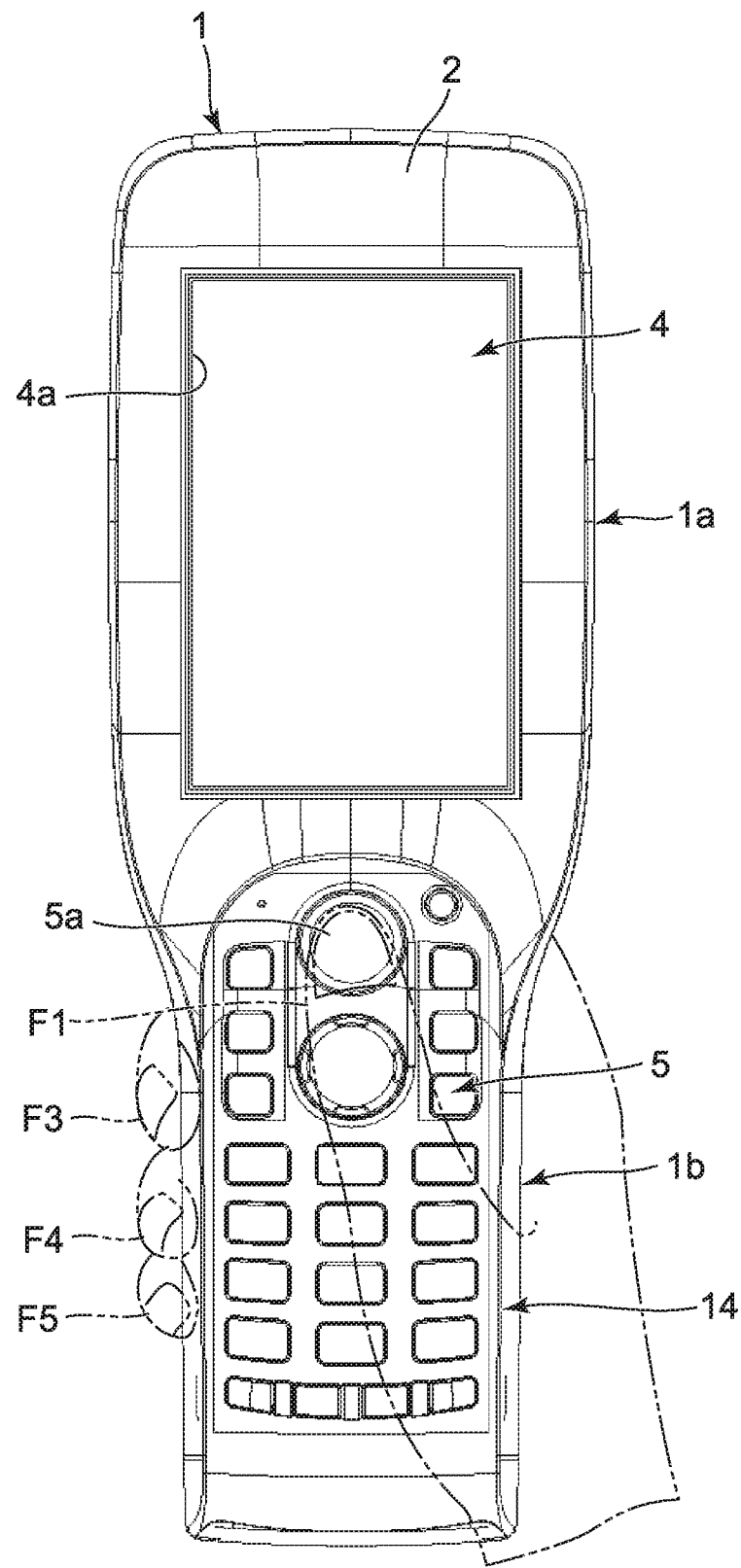
FIG. 1 is a front view of an embodiment in which the present invention has been applied to a portable terminal.
Figure 2:
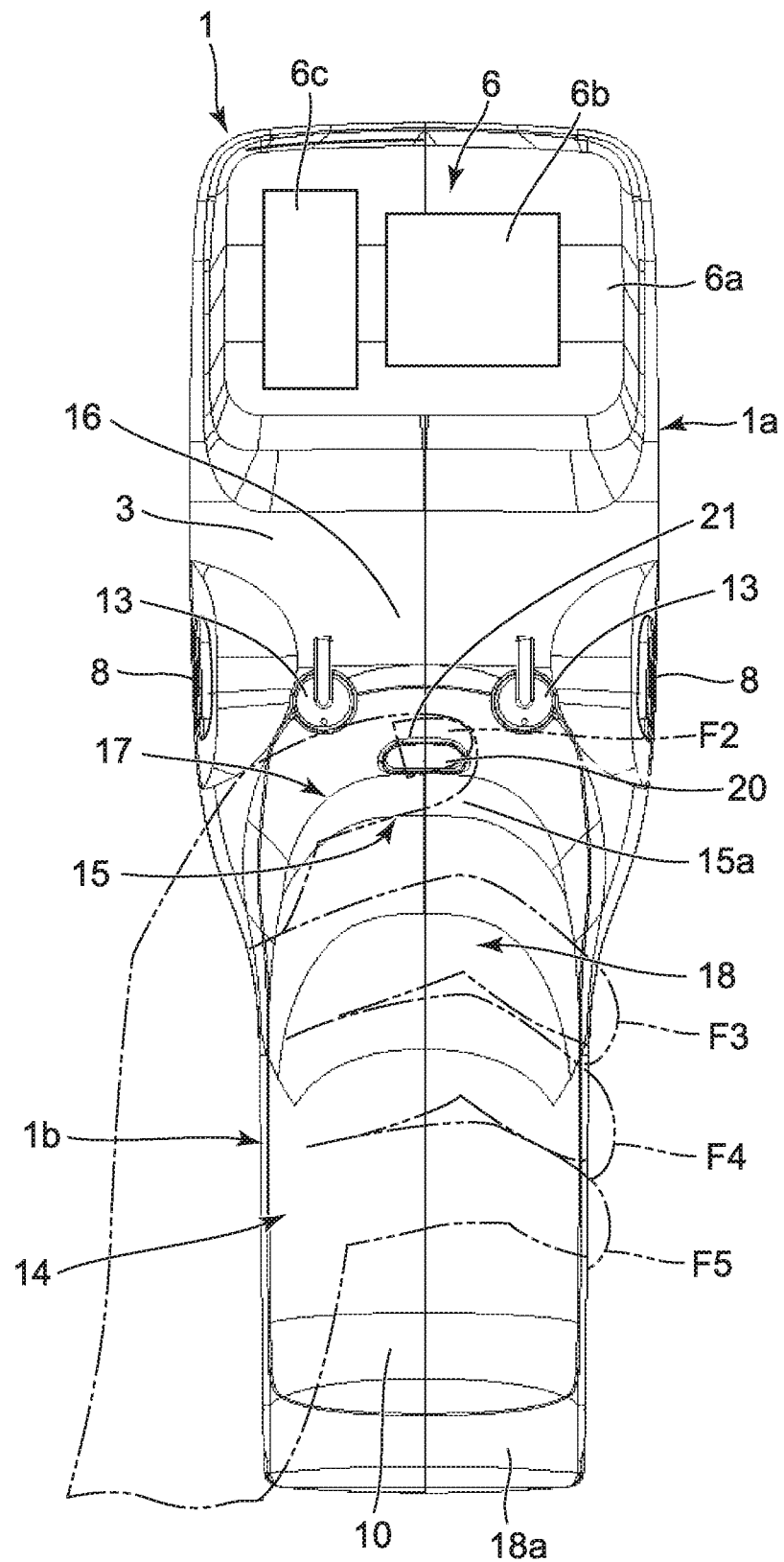
FIG. 2 is a rear view of the portable terminal shown in FIG. 1.
Figure 3:
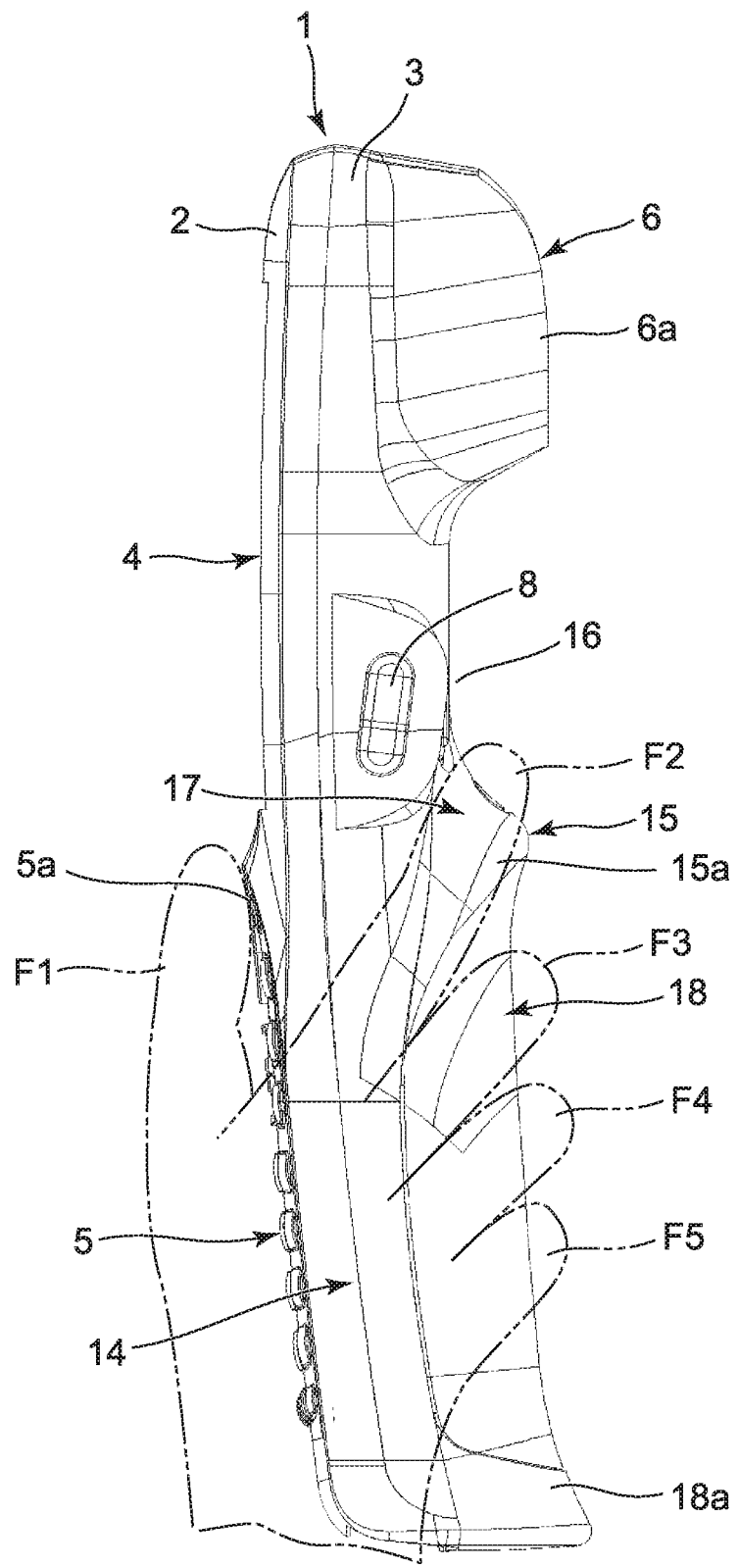
FIG. 3 is a left side view of the portable terminal shown in FIG. 2.

Also, this device case 1 is structured to have an upper case 2 and a lower case 3 and have modules (not shown) incorporated therein, as shown in FIG. 1 to FIG. 5. The upper case 2 is structured to be formed, as with the device case 1, in a substantially Japanese battledore shape having a broad portion on the upper side and a narrow portion on the lower side and have a side surface portion of its outer edge attached to the lower case 3, as shown in FIG. 1 and FIG. 3.

Figure 5:
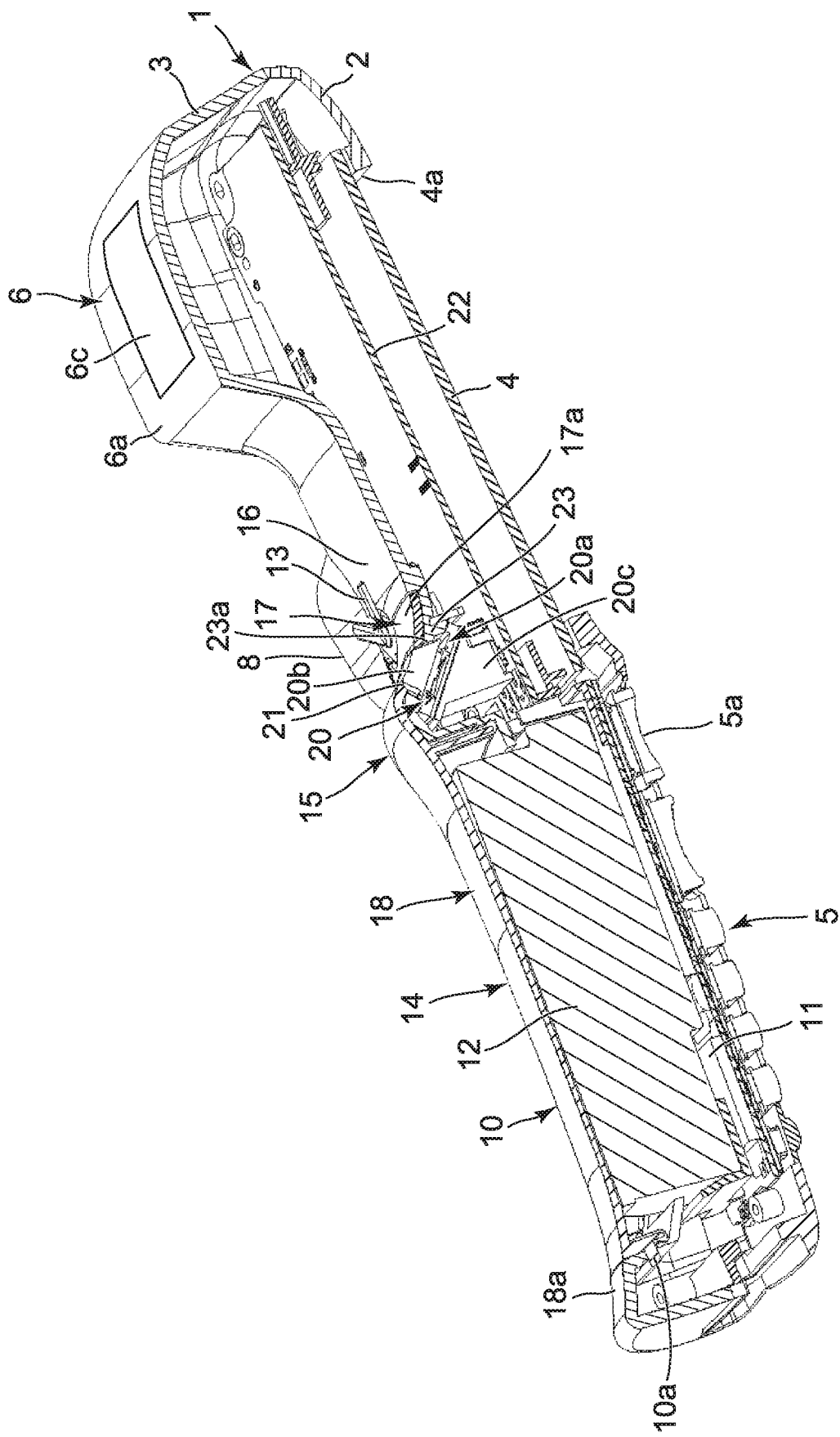
FIG. 5 is a perspective view showing a cross section of the portable terminal taken along line A-A in FIG. 4.

Also, on the broad portion on the upper side on the front surface that is the upper surface of the upper case 2, a display section 4 is provided over a substantially entire area, as shown in FIG. 1 and FIG. 5. Also, on the narrow portion on the lower side on the front surface of the upper case 2, a key operation section 5 is provided over a substantially entire area. The display section 4 is a display panel of a flat-surface type, such as a liquid-crystal display panel or EL (electroluminescence) display panel, and is formed to have a substantially rectangular shape.

This display section 4 is structured to be arranged in the upper case 2 so as to correspond to a display window section 4a provided on the front surface of the upper case 2, whereby information displayed on the display section 4 can be viewed from above the upper case 2 through the display window section 4a, as shown in FIG. 1 and FIG. 5. The key operation section 5 includes various keys required for the portable terminal, such as numeric keys, a cursor key and function keys. In the present embodiment, the key operation section 5 has upper surface trigger key 5a arranged on its upper middle area.

Figure 4:
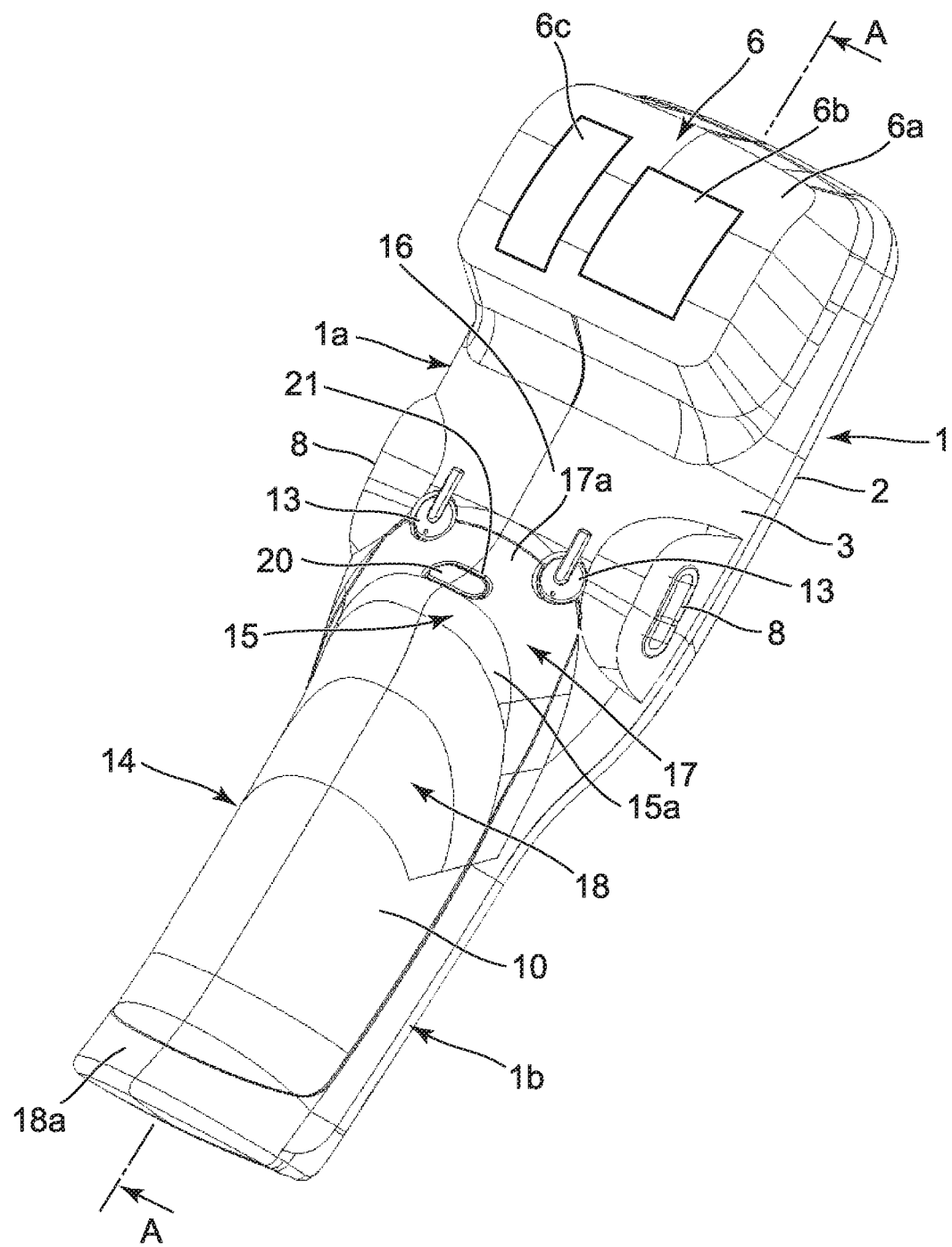
FIG. 4 is a rear perspective view of the portable terminal shown in FIG. 1.

The lower case 3 is structured to be formed, as with the upper case 2, in a substantially Japanese battledore shape having a broad portion on the upper side and a narrow portion on the lower side and have a side surface portion of its outer edge attached to the upper case 2, as shown in FIG. 2 to FIG. 4. An optical reading section 6 is provided on the rear surface as the lower surface of the broad portion positioned on the upper side of this lower case 3.

This optical reading section 6 includes a laser reading section and an imaging section (both are not shown), and these sections are stored in a read projection section 6a provided projecting in a box shape to the rear surface positioned on the upper side in the broad portion of the lower case 3, as shown in FIG. 2 to FIG. 5. In the present embodiment, the read projection section 6a is provided with a first window section 6b corresponding to the laser reading section and a second window section 6c corresponding to the imaging section.

The optical reading section 6 is structured such that the laser reading section emits a laser beam from the first window section 6b of the read projection section 6a to the outside of the device case 1 and receives a reflected light of the laser beam so as to read, for example, a barcode of an article, as shown in FIG. 2 to FIG. 5. Also, this optical reading section 6 is structured such that the imaging section captures, through the second window section 6c, an image of an article from which its barcode is to be read by the laser reading section.

Also, to substantially the midpoint of the device case 1 in the longitudinal direction (length direction), that is, on both sides of the broad portion 1a positioned on a boundary side between the broad portion 1a and the narrow portion 1b, side trigger keys 8 are provided, as shown in FIG. 1 to FIG. 5. These side trigger keys 8 and the upper surface trigger key 5a of the key operation section 5 are to cause a reading operation by the optical reading section 6 to be performed.

Furthermore, on the narrow portion 1b positioned on the lower side of this device case 1, a battery accommodating section 11 to be covered by a battery cover 10 is provided so as to correspond to the key operation section 5, as shown in FIG. 2 to FIG. 5. This battery accommodating section 11 is to accommodate a rechargeable battery 12, is provided inside the narrow portion 1b of the device case 1 so as to correspond to the key operation section 5 provided on the narrow portion 1b of the device case 1, and is open to the back surface side.

Also, on the rear surface of the lower case 3 positioned between the battery accommodating section 11 and the optical reading section 6, a pair of attachment levers 13 is provided to removably attach the battery cover 10 which openably covers the battery accommodating section 11 to the lower case 3, as shown in FIG. 2 and FIG. 4. That is, the pair of attachment levers 13 is provided near the side trigger keys 8 provided on both sides of the device case 1. The pair of these attachment levers 13 is structured to be rotated to removably engage the edge on the upper side of the battery cover 10 with the rear surface of the lower case 3.

As a result, the battery cover 10 is structured to be attached to the rear surface of the lower case 3 by the edge on the upper side being engaged with the lower case 3 by the pair of the attachment levers 13, with it openably covering the battery accommodating section 11, as shown in FIG. 2, FIG. 4, and FIG. 5. Also, a fulcrum projection portion 10a is provided at the end on the lower side of this battery cover 10. The battery cover 10 is structured to open and close the battery accommodating section 11 by rotation by taking this fulcrum projection portion 10a as a fulcrum.

On the narrow portion 1b positioned on the lower side of the device case 1, a grip section 14 is provided so as to be gripped by one hand of the user, across the front surface of the device case 1 serving as a first surface and the rear surface positioned opposite thereto and serving as a second surface, as shown in FIG. 1 to FIG. 4. This grip section 14 is structured to be gripped by one hand of the user in a gripping style where the thumb F1 of one hand of the user is placed on the front surface of the device case 1 and the rear surface of the device case 1 is held by other fingers F2 to F5 extended from the side of the device case 1.

That is, this grip section 14 is constituted by the narrow portion 1b of the device case 1 including the narrow portion of the upper case 2 and the narrow portion of the lower case 3, and the battery cover 10 of the lower case 3, as shown in FIG. 1 to FIG. 4. In the present embodiment, each of sides of the narrow portion of the upper case 2 and the narrow portion of the lower case 3 in the grip section 14 is formed in an arc-shaped curved surface which makes the hand of the user gripping the grip section 14 in the above-described gripping style naturally curved. Also, the battery cover 10 of the lower case 3 is formed in a curved shape projecting so as to be mildly curved from both sides of the lower case 3 toward the rear surface side.

As a result, the grip section 14 has a shape by which the other fingers F2 to F5 are naturally flexed and placed around the rear surface of the device case 1, in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 1 to FIG. 4.

That is, the grip section 14 is formed in a shape that can be easily gripped by one hand irrespective of the size of the hand of the user, by the gripping hand of the user fitting thereto when the user holds the device case 1 by one hand in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 1 to FIG. 4.

Also, in this grip section 14, the battery cover 10 positioned on the rear surface is provided with a raised portion 15 as shown in FIG. 2 to FIG. 5. The raised portion 15 that is raised between the index finger F2 and the middle finger F3 of the gripping hand of the user when the user holds the device case 1 by one hand in the gripping style where the user places the thumb F1 on the front surface of the device case 1 and holds the rear surface of the device case 1 by the other fingers F2 to F5 extended from the side of the device case 1.

Also, on the rear surface of the device case 1, a recessed portion 16 is provided so as to be recessed between the grip section 14 and the upper side of the device case 1 positioned in an extended area of this grip section 14, as shown in FIG. 2 to FIG. 5. That is, this recessed portion 16 is provided so as to be recessed between the raised portion 15 of the battery cover 10 and the read projection section 6a of the optical reading section 6.

As a result, the recessed portion 16 is structured such that the index finger F2 of the hand of the user gripping the grip section 14 is placed on a sloped surface of the recessed portion 16 positioned on the grip section 14 side when the user holds the grip section 14 by one hand in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 2 to FIG. 5.

Also, the raised portion 15 has a V-shaped vertex portion 15a positioned between the index finger F2 and the middle finger F3 of the gripping hand of the user when the user holds the grip section 14 by one hand in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 2 to FIG. 5. This vertex portion 15a is formed to be positioned between the index finger F2 and the middle finger F3 of the gripping hand of the user so as to be contiguous in a curved shape along a bent shape of the index finger F2 and the middle finger F3.

That is, this vertex portion 15a is formed so as to be contiguous in a curved shape along the bent shape of the index finger F2 and the middle finger F3 in a lateral direction orthogonal to the length direction of the device case 1 so that a contiguous middle portion in the lateral direction projects most toward the rear surface side of the device case 1 and the projection length gradually decreases from the middle portion in the lateral direction toward the both sides in the lateral direction, as shown in FIG. 2 to FIG. 5. Also, with the vertex portion 15a as a boundary, this raised portion 15 includes a first finger rest area 17 as one tail and a second finger rest area 18 as the other tail.

The first finger rest area 17 is a sloped surface onto which the index finger F2 is pressed when the user grips the grip section 14 in the above-described gripping style, and is formed as a steep sloped surface from the upper side of the battery cover 10 toward the vertex portion 15a, as shown in FIG. 2 to FIG. 5. The second finger rest area 18 is a sloped surface onto which the middle finger F3 to the small finger F5 are pressed when the user grips the grip section 14 in the above-described gripping style, and is formed as a sloped surface mildly sloped from the vertex portion 15a toward the lower side of the battery cover 10.

That is, the first finger rest area 17 is formed as a sloped surface onto which the pulp of the index finger F2 of the hand of the user gripping the grip section 14 is pressed toward the lower side of the battery cover 10 in the longitudinal direction (length direction), that is, the hand of the user gripping the grip section 14 in the gripping style where the user places the thumb F1 on the key operation section 5 so as to operate the key operation section 5 by the thumb F1 and holds the rear surface of the device case 1 by the other fingers F2 to F5 extended from the side of the device case 1, as shown in FIG. 2 to FIG. 5.

This first finger rest area 17 is the sloped surface of the recessed portion 16 positioned on the grip section 14 side, and is formed as a sloped surface rising from the upper side positioned on the upper side of the battery cover 10 toward the vertex portion 15a at a steep angle, as shown in FIG. 2 to FIG. 5. Also, this first finger rest area 17 is curved in an arc shape corresponding to the bent state of the index finger F2 along the vertex portion 15a contiguous in the lateral direction orthogonal to the longitudinal direction (length direction) of the device case 1.

Accordingly, the raised portion 15 is structured such that the pulp of the index finger F2 of the user is pressed onto the first finger rest area 17 as the index finger F2 is in a shape being bent along the curve of the first finger rest area 17 and, in this state, the index finger F2 pulls the first finger rest area 17 toward the lower side of the device case 1 in the longitudinal direction, that is, toward the hand of the user gripping the grip section 14, when the user grips the grip section 14 in the gripping style where the user places the thumb F1 on the key operation section 5 and holds the rear surface of the device case 1 by the other fingers F2 to F5 extended from the side of the device case 1, as shown in FIG. 2 to FIG. 5.

On the other hand, the second finger rest area 18 is formed as a curved surface such that the pulp of each of the other fingers F3 to F5 of the hand of the user gripping the grip section 14 causes the battery cover 10 of the grip section 14 to be pressed toward the device case 1 and the middle finger F3 to the small finger F5 of the user are naturally flexed with them being aligned, when the user grips the grip section 14 in the gripping style where the user places the thumb F1 on the key operation section 5 so as to operate the key operation section 5 by the thumb F1 and holds the rear surface of the device case 1 by the other fingers F2 to F5 extended from the side of the device case 1, as shown in FIG. 2 to FIG. 5.

That is, this second finger rest area 18 is formed as a curved surface mildly sloped from the vertex portion 15a toward the lower side of the battery cover 10, as shown in FIG. 2 to FIG. 4. As a result, this second finger rest area 18 is formed in a mild curved shape with a convex toward the rear surface side of the device case 1 so that the fingers F3 to F5 other than the index finger F2 are aligned and naturally flexed, when the user grips the grip section 14 in the gripping style where the user places the thumb F1 on the key operation section 5 and holds the rear surface of the device case 1 by the other fingers F2 to F5 extended from the side of the device case 1.

Also, this second finger rest area 18 is provided with a finger restricting convex section 18a which restricts the position of the small finger F5 of the gripping hand of the user from the lower side of the battery cover 10 to the lower side of the device case 1 on the rear surface, as shown in FIG. 2 to FIG. 5. That is, this finger restricting convex section 18a is formed as a sloped surface mildly rising from the lower side of the battery cover 10 to the lower side of the device case 1.

As a result, the finger restricting convex section 18a is structured so as to have the pulp of the small finger F5 of the hand of the user gripping the grip section 14 placed thereon and restrict the position of the small finger F5 so as to prevent the small finger F5 from going away from the grip section 14, when the thumb F1 performs key operations on the key operation section 5 of the device case 1 with the user gripping the grip section 14 in the gripping style where the user places the thumb F1 on the key operation section 5 and holds the rear surface of the device case 1 by the other fingers F2 to F5 extended from the side of the device case 1, as shown in FIG. 1 to FIG. 5.

Furthermore, this device case 1 is formed such that the grip section 14 has a bilaterally symmetrical shape with respect to the center position of the device case 1 in the lateral direction, as shown in FIG. 1 to FIG. 5. As a result, this device case 1 is structured such that the user can grip the grip section 14 by the right hand or the left hand in a similar manner.

The first finger rest area 17 of the raised portion 15 provided on the upper side of the battery cover 10 is structured to be held by the rear surface of a cover holding section 23 provided to the lower case 3, as shown in FIG. 5. That is, this cover holding section 23 is raised and formed in a shape substantially similar to that of the first finger rest area 17. Inside this cover holding section 23, a lower surface trigger key 20 is provided corresponding to the first finger rest area 17.

As with the upper surface trigger key 5a of the key operation section 5 and the side trigger keys 8, this lower surface trigger key 20 is to cause a reading operation by the optical reading section 6 to be performed, as shown in FIG. 5. This lower surface trigger key 20 includes a switch main body 20a, an operation button 20b, and a switch holding section 20c.

That is, the switch holding section 20c of this lower surface trigger key 20 is attached to the inner surface of the cover holding section 23 with it being arranged in the cover holding section 23 corresponding to the first finger rest area 17, as shown in FIG. 5. The switch main body 20a is structured to be held in the switch holding section 20c with it being sloped in parallel to the sloped surface of the first finger rest area 17 and, in this state, be electrically connected to a circuit board 22 provided in the broad portion 1a of the device case 1.

The operation button 20b is a pressing target portion, which is arranged in the switch main body 20a sloped in parallel to the sloped surface of the first finger rest area 17, and arranged in a button insertion hole 21 provided in the first finger rest area 17 of the battery cover 10 through a button hole 23a provided in the cover holding section 23. As a result, the operation button 20b is structured to cause the switch main body 20a to perform an ON operation when a pressing operation is performed from outside the device case 1. In the present embodiment, the operation button 20b is arranged in the button insertion hole 21 of the first finger rest area 17 without projecting to the outside of the device case 1.

Accordingly, the lower surface trigger key 20 is structured such that the operation button 20b is not pressed by the pulp of the index finger F2 and the switch main body 20a does not perform an ON operation even if the pulp of the index finger F2 of the hand of the user gripping the grip section 14 is pressed onto the first finger rest area 17 along its curve with the index finger F2 being in a bent shape and, in this state, the raised portion 15 is pulled toward the lower side of the device case 1, that is, toward the hand of the user gripping the grip section 14, when the user grips the grip section 14 of the device case 1 by one hand, as shown in FIG. 5.

Also, the lower surface trigger key 20 is structured such that, in the pressing state in which the user grips the grip section 14 of the device case 1 by one hand and presses the pulp of the index finger F2 of the hand gripping the grip section 14 along the curve of the first finger rest area 17 with the index finger F2 being in a bent shape, when the pulp of the index finger F2 pulls the raised portion 15 toward the lower side of the device case 1, that is, toward the hand of the user gripping the grip section 14, and is strongly pushed into the button insertion hole 21, the operation button 20b is pushed by the pulp of the index finger F2 to cause the switch main body 20a to perform an ON operation, as shown in FIG. 2.

Next, the mechanism of this portable terminal is described.

To use this portable terminal, the user first attaches the battery cover 10 to the rear surface of the device case 1 so as to cover the battery accommodating section 11 provided to the narrow portion 1b of the device case 1. Here, the end portion of the battery cover 10 on the lower side is attached to the inner edge portion of the battery accommodating section 11 on the lower side and, with the fulcrum projection portion 10a at the end of this attached battery cover 10 as a fulcrum, the battery cover 10 is rotated to cause the upper side of the battery cover 10 to be placed on the cover holding section 23 of the lower case 3.

As a result, since the button insertion hole 21 provided in the first finger rest area 17 of the battery cover 10 corresponds to the button hole 23a of the cover holding section 23, the above-described operation causes the operation button 20b that is a pressing target portion of the lower surface trigger key 20 to be inserted through this button hole 23a into the button insertion hole 21 provided in the first finger rest area 17 of the battery cover 10. Here, the operation button 20b is arranged inside the button insertion hole 21 of the first finger rest area 17 without projecting outside the device case 1.

Also, here, the edge of the upper side of the battery cover 10 corresponds to the pair of attachment levers 13 provided on the rear surface of the lower case 3. Accordingly, by the user rotating the pair of these attachment levers 13, the edge of the upper side of the battery cover 10 is pressed onto and engaged with the rear surface of the lower case 3 by the pair of attachment levers 13. As a result, the battery cover 10 covers the battery accommodating section 11 and is attached to the rear surface of the lower case 3 across the lower surface trigger key 20.

To use this portable terminal, the user holds the device case 1 by gripping the grip section 14 at the position of the battery cover 10 by one hand. That is, the user grips the grip section 14 by one hand in the gripping style where the user places the thumb F1 on the key operation section 5 so as to operate the key operation section 5 by the thumb F1 and holds the rear surface of the device case 1 by the other fingers F2 to F5 extended from the side of the device case 1.

Here, the thumb F1 is placed above the key operation section 5 on the front surface of the device case 1, and the vertex portion 15a of the raised portion 15 is arranged between the index finger F2 and the middle finger F3 of the hand of the user gripping the grip section 14. In this state, the pulp of the index finger F2 is pressed onto the first finger rest area 17 in the raised portion 15 of the battery cover 10 positioned on the rear surface side of the device case 1, and the pulp of each of the other fingers F3 to F5 is placed on the second finger rest area 18 of the raised portion 15.

In this state, in the gripping style where the user places the thumb F1 on the key operation section 5 so as to operate the key operation section 5 by the thumb F1 and holds the rear surface of the device case 1 by the other fingers F2 to F5 extended from the side of the device case 1, the pulp of the index finger F2 of the hand of the user gripping the grip section 14 is pressed onto the sloped surface of the first finger rest area 17 in the raised portion 15 of the battery cover 10 and, in this state, the index finger F2 of the gripping hand is pulled so that the first finger rest area 17 is pulled toward the lower side of the raised portion 15, that is, toward the hand of the user gripping the grip section 14.

In the present embodiment, when the pulp of the index finger F2 is pressed onto the sloped surface of the first finger rest area 17 in the raised portion 15 of the battery cover 10 and is pulled toward the lower side of the device case 1, that is, toward the hand of the user gripping the grip section 14, the index finger F2 is naturally flexed and pressed along the first finger rest area 17.

Here, even when the index finger F2 of the hand of the user gripping the grip section 14 is pressed onto the first finger rest area 17 along its curve with it being in a bent shape, the pulp of the index finger F2 is not deeply pressed into the button insertion hole 21 in the first finger rest area 17. Accordingly, the operation button 20b is not pushed by the pulp of the index finger F2, and the switch main body 20a does not perform an ON operation.

Also, here, in the gripping style where the user places the thumb F1 on the key operation section 5 so as to operate the key operation section 5 by the thumb F1 and holds the rear surface of the device case 1 by the other fingers F2 to F5 extended from the side of the device case 1, the pulp of each of the other fingers F3 to F5 of the hand of the user gripping the grip section 14 is pressed onto the second finger rest area 18 of the raised portion 15. In this state, the fingers F3 to F5 are placed with them being naturally flexed along the curved surface of the second finger rest area 18.

That is, with the vertex portion 15a of the raised portion 15 being arranged between the index finger F2 and the middle finger F3 of the gripping hand of the user, the middle finger F3 to the small finger F5 are placed so as to be aligned in the second finger rest area 18 with them being naturally flexed to wrap the second finger rest area 18 of the raised portion 15. Accordingly, the fingers F3 to F5 are favorably and stably placed along the curved surface of the second finger rest area 18. This allows the user to reliably and favorably grip the grip section 14 of the device case 1 by one hand.

As described above, the grip section 14 is provided to the narrow portion 1b of the device case 1, and has a curved shape projecting to be mildly curved from both sides toward the rear surface of the grip section 14. As a result, when the user grips the grip section 14 of the device case 1, the user can reliably and favorably grip the grip section 14 of the device case 1 by the hand gripping the grip section 14. Also, the user can fit the hand gripping the grip section 14 to the grip section 14.

Also, the grip section 14 is formed in a bilaterally symmetrical shape with respect to the center position of the device case 1 in the lateral direction. Therefore, when the user grips the grip section 14 of the device case 1 by one hand, the grip section 14 of the device case 1 can be reliably and favorably gripped by the right hand or the left hand of the user. Here, by the lower surface of the grip section 14 being formed in a curved shape mildly curved to project, the gripping hand of the user fits the grip section 14 when the user grips the grip section 14 of the device case 1 by one hand.

When the user grips the grip section 14 of the device case 1 as described above, the thumb F1 is placed above the key operation section 5 without obstructing the display section 4, so that the user can favorably perform key operations on the key operation section 5 by freely moving the thumb F1 above the key operation section 5 while viewing information displayed on the display section 4.

Here, by the finger restricting convex section 18a provided from the lower side of the battery cover 10 to the lower side on the rear surface of the device case 1, the small finger F5 of the gripping hand is positionally restricted so that the small finger F5 of the hand of the user gripping the grip section 14 is prevented from falling from the grip section 14. Accordingly, when the user freely moves the thumb F1 above the key operation section 5 to perform key operations on the key operation section 5, the small finger F5 of the gripping hand does not fall from the grip section 14, and therefore the user can favorably grip the grip section 14.

Also, when the user grips the grip section 14 of the device case 1 by one hand, the index finger F2 is placed on the sloped surface of the first finger rest area 17 of the raised portion 15, that is, the sloped surface of the recessed portion 16 positioned on the grip section 14 side. Therefore, the user can easily operate, by using the index finger F2, the operation button 20b of the lower surface trigger key 20 inserted into the button insertion hole 21 provided in the first finger rest area 17 that is the sloped surface of this recessed portion 16.

That is, when the user grips the grip section 14 of the device case 1 by one hand, the user presses the pulp of the index finger F2 of the hand gripping the grip section 14 onto the first finger rest area 17 along its curve with the index finger F2 being in a bent shape, and pulls the first finger rest area 17 toward the lower side of the device case 1, that is, toward the hand of the user gripping the grip section 14. In this state, when the pulp of the index finger F2 is strongly pushed into the button insertion hole 21, the operation button 20b of the lower surface trigger key 20 is pushed by the pulp of the index finger F2 to cause the switch main body 20a of the lower surface trigger key 20 to perform an ON operation.

When the lower surface trigger key 20 performs an ON operation as described above, the optical reading section 6 provided on the rear surface of the broad portion 1a of the device case 1 is driven to cause the laser reading section to emit a laser beam from the first window section 6b of the read projecting portion 6a to the outside of the device case 1, and receives a reflected light of the laser beam so as to read, for example, a barcode of an article. Also, here, through the second window section 6c, the imaging section of the optical reading section 6 captures an image of, for example, an article from which its barcode is to be read.

Also, when the user grips the grip section 14 of the device case 1 by one hand and performs an ON operation on the lower surface trigger key 20 as described above, the finger restricting convex section 18a provided from the lower side of the battery case 10 to the lower side of the rear surface of the device case 1 can positionally restrict the small finger F5 of the hand of the user gripping the grip section 14 so that the small finger F5 of the gripping hand does not fall from the grip section 14.

Accordingly, when operating the lower surface trigger key 20 by the index finger F2 while performing key operations on the key operation section 5 by the thumb F1, the user can favorably perform key operations on the key operation section 5 while favorably gripping the grip section 14, and can favorably operate the lower surface trigger key 20.

As described above, this portable terminal includes the grip section 14 which is provided as one end of the device case 1 serving as a terminal main body and is capable of being gripped in the gripping style where the user places the thumb F1 of one hand on the front surface of the device case 1 and holds the rear surface of the device case 1 by at least the index finger F2 and the middle finger F3 extended from the side of the device case 1. Therefore, the user can place the hand gripping the grip section 14 on the grip section 14 of the device case 1 in a natural form, and thereby can grip the grip section 14 while favorably fitting the hand gripping the grip section 14 to the grip section 14.

Also, this portable terminal is provided with the raised portion 15 such that the vertex portion 15a is positioned between the index finger F2 and the middle finger F3 of the hand of the user gripping the grip section 14 when the user grips the device case 1 in the gripping style where the user places the thumb F1 on the front surface of the device case 1 and holds the rear surface of the device case 1 by at least the index finger F2 and the middle finger F3 extended from the side of the device case 1. Therefore, the user can press the pulp of the index finger F2 of the hand gripping the grip section 14 onto the first finger rest area 17 that is a sloped surface area positioned on the index finger F2 side of the raised portion 15.

Accordingly, in this portable terminal, the user can press the pulp of the index finger F2 of the hand gripping the grip section 14 onto the first finger rest area 17 that is a sloped surface of the raised portion 15 toward the lower side of the raised portion 15, that is, toward the gripping hand of the user. Therefore, the index finger F2 can be pulled toward the gripping hand of the user positioned on the lower side of the device case 1, and whereby the user can grip the device case 1 by reliably and favorably gripping the grip section 14 of the device case 1.

Also, this portable terminal is provided with the lower surface trigger key 20 which is operable by the index finger F2 of the hand of the user gripping the grip section 14 when the user grips the grip section 14 in the gripping style where the user places the thumb F1 on the front surface of the device case 1 and holds the rear surface of the device case 1 by at least the index finger F2 and the middle finger F3 extended from the side of the device case 1. The lower surface trigger key 20 is provided inside the device case 1 so as to correspond to the first finger rest area 17 that is a sloped surface area of the raised portion 15. Therefore, the user can favorably operate the lower surface trigger key 20 by the index finger F2 of the hand gripping the grip section 14.

That is, this portable terminal is provided with the lower surface trigger key 20 so as to expose the operation button 20b that is a pressing target portion from the first finger rest area 17 that is a sloped surface area of the raised portion 15. Therefore, when the user grips the grip section 14 in the gripping style where the user places the thumb F1 on the front surface of the device case 1 and holds the rear surface of the device case 1 by at least the index finger F2 and the middle finger F3 extended from the side of the device case 1, the index finger F2 of the hand of the user gripping the grip section 14 can be placed so as to correspond to the lower surface trigger key 20, and the lower surface trigger key 20 can be operated in this state, whereby the operability of the lower surface trigger key 20 can be improved.

Also, this portable terminal is provided with the recessed portion 16 between the grip section 14 positioned on the rear surface of the device case 1 and the other end of the device case 1 positioned in its extended area. Also, in the gripping style where the user places the thumb F1 on the front surface of the device case 1 and holds the rear surface of the device case 1 by at least the index finger F2 and the middle finger F3 extended from the side of the device case 1, since the position supported by the index finger F2 is formed in the first finger rest area 17 that is a sloped surface extending toward the recessed portion 16, the user can easily, reliably, and favorably grip the device case 1 by one hand.

That is, in this portable terminal, when the user grips the grip section 14 in the gripping style where the user places the thumb F1 on the front surface of the device case 1 and holds the rear surface of the device case 1 by at least the index finger F2 and the middle finger F3 extended from the side of the device case 1, the pulp of the index finger F2 of the gripping hand can be pressed onto the first finger rest area 17 that is a sloped surface of the recessed portion 16 on the grip section 14 side toward the lower side of the recessed portion 16, that is, toward the hand of the user gripping the grip section 14.

Accordingly, in this portable terminal, the index finger F2 of the hand of the user gripping the grip section 14 can be pressed onto the first finger rest area 17 on the lower side of the recessed portion 16 toward the hand of the user gripping the grip section 14. This also allows the lower side of the recessed portion 16 to be pulled toward the gripping hand of the user. As a result, the user can grip the device case 1 by reliably and favorably gripping the grip section 14 of the device case 1.

Also, this portable terminal includes the lower surface trigger key 20 which is provided inside the device case 1 so as to correspond to the first finger rest area 17 that is a sloped surface of the recessed portion 16 on the grip section 14 side, and is operable by the index finger F2 of the hand of the user gripping the grip section 14 when the user grips the grip section 14 in the gripping style where the user places the thumb F1 on the front surface of the device case 1 and holds the rear surface of the device case 1 by at least the index finger F2 and the middle finger F3 extended from the side of the device case 1. Therefore, the user can favorably operate the lower surface trigger key 20 while reliably and favorably gripping the grip section 14 of the device case 1.

Also, according to this portable terminal, the rear surface of the grip section 14 provided at one end of the device case 1 is formed in a curved shape mildly projecting toward the rear surface so that the fingers F2 to F5 other than the thumb F1 can be naturally flexed when the user grips the device case 1 in the gripping style where the user places the thumb F1 on the front surface of the device case 1 and holds the rear surface of the device case 1 by at least the index finger F2 and the middle finger F3 extended from the side of the device case 1. Therefore, the user can easily, reliably, and favorably grip the grip section 14 by one hand.

That is, in this portable terminal, the thumb F1 of the user is placed on the front surface of the device case 1, and the other fingers F2 to F5 extend from the side of the device case 1 and naturally placed around and along the curved shape of the rear surface of the device case 1, whereby the fingers F2 to F5 other than the thumb F1 of the user can be naturally flexed. Accordingly, the hand of the user gripping the grip section 14 can be placed so as to fit the grip section 14 of the device case 1. Therefore, the user can easily, reliably, and favorably grip the grip section 14 by one hand.

Also, this portable terminal is provided with the raised portion 15 provided projecting to the rear surface of the grip section 14 having a curved shape so that the vertex portion 15*a* is positioned between the index finger F2 and the middle finger F3 of the gripping hand of the user when the user grips the grip section 14 in the gripping style where the user places the thumb F1 on the front surface of the device case 1 and holds the rear surface of the device case 1 by at least the index finger F2 and the middle finger F3 extended from the side of the device case 1. Therefore, the user can press the pulp of the index finger F2 of the gripping hand onto the first finger rest area 17 that is a sloped surface of the raised portion 15 while placing the hand gripping the grip section 14 such that it is fitted to the grip section 14 of the device case 1.

Accordingly, in this portable terminal, with the pulp of the index finger F2 of the hand of the user gripping the grip section 14 being pressed onto the first finger rest area 17 that is a sloped surface of the raised portion 15 toward the lower side of the raised portion 15, that is, toward the gripping hand, the first finger rest area 17 can be pulled toward the gripping hand of the user positioned on the lower side of the device case 1. Therefore, the user can grip the device case 1 by reliably and favorably gripping the grip section 14 of the device case 1.

Also, this portable terminal includes the raised portion 15 provided on the rear surface of the grip section 14 and having a shape by which the index finger F2 and the middle finger F3 are placed on both sides of the vertex portion 15*a* when the user grips the grip section 14 in the gripping style where the user places the thumb F1 on the front surface of the device case 1 and holds the rear surface of the device case 1 by at least the index finger F2 and the middle finger F3 extended from the side of the device case 1. Therefore, the user can press the pulp of the index finger F2 of the gripping hand onto the first finger rest area 17 that is a sloped surface of the raised portion 15 while placing the hand gripping the grip section 14 so as to fit the hand to the grip section 14 of the device case 1.

Furthermore, the portable terminal includes the key operation section 5 provided on the front surface of the grip section 14 and serving as an input operation section having arrayed thereon a plurality of keys operable by the thumb F1 of the hand of the user gripping the grip section 14 when the user grips the grip section 14 in the gripping style where the user places the thumb F1 on the front surface of the grip section 14 and holds the rear surface of the device case 1 by at least the index finger F2 and the middle finger F3 extended from the side of the device case 1. Therefore, the user can favorably perform key operations on the key operation section 5 by the thumb F1 of the gripping hand while gripping the grip section 14 to grip the device case 1, and thereby can favorably provide inputs.

Also, this portable terminal is provided with the display section 4 which displays information on the front surface of the device case 1 positioned in an extended area of the grip section 14. Therefore, when the user grips the grip section 14 in the gripping style where the user places the thumb F1 on the front surface of the grip section 14 and holds the rear surface of the device case 1 by at least the index finger F2 and the middle finger F3 extended from the side of the device case 1, the thumb F1 is placed above the key operation section 5 without obstructing the display section 4. Therefore, the user can favorably view the information displayed on the display section 4, and can favorably perform key operations on the key operation section 5 by freely moving the thumb F1 above the key operation section 5.

Furthermore, according to this portable terminal, the optical reading section 6 which optically reads information is provided on the rear surface of the device case 1 positioned in the extended area of the grip section 14. Therefore, when the lower surface trigger key 20 is pressed by the index finger F2 so as to perform an ON operation, the optical reading section 6 is driven, and the barcode of an article or the like can be favorably read by the laser reading section. In addition, an image of the article to be read by the laser reading section can be favorably captured by the imaging section of the optical reading section 6.

Also, in this portable terminal, the battery cover 10 is attached to the rear surface side of the grip section 14. Therefore, the first finger rest area 17 and the second finger rest area 18 of the raised portion 15 and the sloped surface of the recessed portion 16 which is the first finger rest area 17 can be provided to the battery cover 10. Therefore, the raised portion 15 and the sloped surface of the recessed portion 16 can be easily manufactured together with the battery cover 10, the shape of the device case 1 can be made simple, and the device case 1 can be easily manufactured.

In the above-described embodiment, the display section 4 and the key operation section 5 are provided on the front surface of the device case 1. However, the present invention is not limited thereto. For example, the key operation section 5 may be an input display section formed of a transparent touch panel and having a display panel laminated thereon.

While the present invention has been described with reference to the preferred embodiments, it is intended that the invention be not limited by any of the details of the description therein but includes all the embodiments which fall within the scope of the appended claims.

What is claimed is:

1. A portable terminal comprising:
    a device body having a first end and a second end along a longitudinal direction thereof, and having a front side and a back side at opposite sides thereof in a thickness direction that is orthogonal to the longitudinal direction;
    a grip section located closer to the first end than to the second end of the device body;
    a projecting section located closer to the second end than to the first end of the device body, the projecting section forming at least a part of an accommodating section that accommodates at least a part of a scanner mechanism or at least a part of a camera mechanism, wherein the projecting section projects in the thickness direction of the device body; and
    an operation switch provided between the projection section and the first end of the device body, the operation switch comprising a pressing surface that is configured to be pressed by a user, and the pressing surface being at an angle with respect to the thickness direction so as to face outward from the device body and in a direction toward the second end of the device body;
    wherein the grip section includes a sloped surface provided between the operation switch and the first end of the device body, the sloped surface facing away from a direction faced by the pressing surface of the operation switch.

2. The portable terminal according to claim 1, wherein the first end of the device body is narrower than the second end of the device body, in a lateral direction that is orthogonal to both the longitudinal direction and the thickness direction.

3. The portable terminal according to claim 1, further comprising an input operation section which comprises a plurality of keys and is provided at the front side of the device body and is closer to the first end than to the second end of the device body.

4. The portable terminal according to claim 1, further comprising a display which is provided at the front side of the device body and is closer to the second end than to the first end of the device body.

5. The portable terminal according to claim 1, wherein the projecting section includes at least one window that faces outward from the projecting section in the thickness direction.

6. The portable terminal according to claim 1, wherein the back side of the device body comprises a battery cover which forms part of the grip section.

7. The portable terminal according to claim 6, further comprising two attachment members provided at the back side of the device body to secure the battery cover;
wherein the two attachment members are provided at opposite sides of the operation switch in a lateral direction that is orthogonal to both the longitudinal direction and the thickness direction.

8. The portable terminal according to claim 1, further comprising a convex section which is provided at the back surface of the device body at the first end of the device body, and which projects in the thickness direction.

9. The portable terminal according to claim 1, wherein the device body has a recess between the grip section and the projection section, such that the device body is thinner at the recess than at the grip section and the projection section, in the thickness direction.

10. The portable terminal according to claim 1, further comprising an input operation section which comprises a plurality of keys and is provided at the front side of the device body and is closer to the first end than to the second end of the device body.

11. A portable terminal comprising:
a device body having a first end and a second end along a longitudinal direction thereof, and having a front side and a back side at opposite sides thereof in a thickness direction that is orthogonal to the longitudinal direction;
a grip section formed by the device body and located closer to the first end than to the second end of the device body in the longitudinal direction, wherein the grip section comprises a raised portion at the back side of the device body, and the raised portion includes (i) a vertex projecting outward in the thickness direction at the back side of the device body, and (ii) a sloped surface that slopes away from the vertex and extends toward the first end of the device body in the longitudinal direction;
an accommodating section formed by the device body and located closer to the second end than to the first end of the device body in the longitudinal direction, wherein the accommodating section accommodates at least a part of a scanner mechanism or at least a part of a camera mechanism, and wherein the accommodating section comprises a projection which projects outward in the thickness direction at the back side of the device body; and
an operation switch which is provided at the back side of the device body and is positioned between (i) the projection of the accommodating section and (ii) the vertex of the raised portion of the grip section, in the longitudinal direction;
wherein the operation switch includes a pressing surface which faces outward with respect to the back side of the device body and is at an angle with respect to the thickness direction and the longitudinal direction.

12. The portable terminal according to 11, wherein the pressing surface of the operation switch and the sloped surface the raised portion of the grip section face in different directions.

13. The portable terminal according to claim 11, wherein the first end of the device body is narrower than the second end of the device body, in a lateral direction that is orthogonal to both the longitudinal direction and the thickness direction.

14. The portable terminal according to claim 11, wherein the projecting section includes at least one window that faces outward from the projecting section in the thickness direction.

15. The portable terminal according to claim 11, wherein the back side of the device body comprises a battery cover which forms part of the grip section.

16. The portable terminal according to claim 15, further comprising two attachment members provided at the back side of the device body to secure the battery cover;
wherein the two attachment members are provided at opposite sides of the operation switch in a lateral direction that is orthogonal to both the longitudinal direction and the thickness direction.

17. The portable terminal according to claim 11, further comprising a convex section which is provided at the back surface of the device body at the first end of the device body, and which projects in the thickness direction;
wherein the sloped surface of the raised portion is provided between the vertex of the raised portion and the convex section; and
wherein the convex section projects in the thickness direction with respect to the sloped surface.

18. The portable terminal according to claim 11, wherein the device body has a recess between the grip section and the projection of the accommodating section, such that the device body is thinner at the recess than at the grip section and the projection, in the thickness direction.

19. The portable terminal according to claim 18, further comprising a display which is provided at the front side of the device body and is closer to the second end than to the first end of the device body.

* * * * *

UNITED STATES PATENT AND TRADEMARK OFFICE
CERTIFICATE OF CORRECTION

PATENT NO. : 10,936,836 B2
APPLICATION NO. : 16/577382
DATED : March 2, 2021
INVENTOR(S) : Yasunori Chiba et al.

Page 1 of 1

It is certified that error appears in the above-identified patent and that said Letters Patent is hereby corrected as shown below:

In the Claims

Column 16, Line 16 (Claim 12, Line 1), before "11" insert --claim--.
Column 16, Line 18 (Claim 12, Line 3), after "surface" insert --of--.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*